Patented Nov. 8, 1938

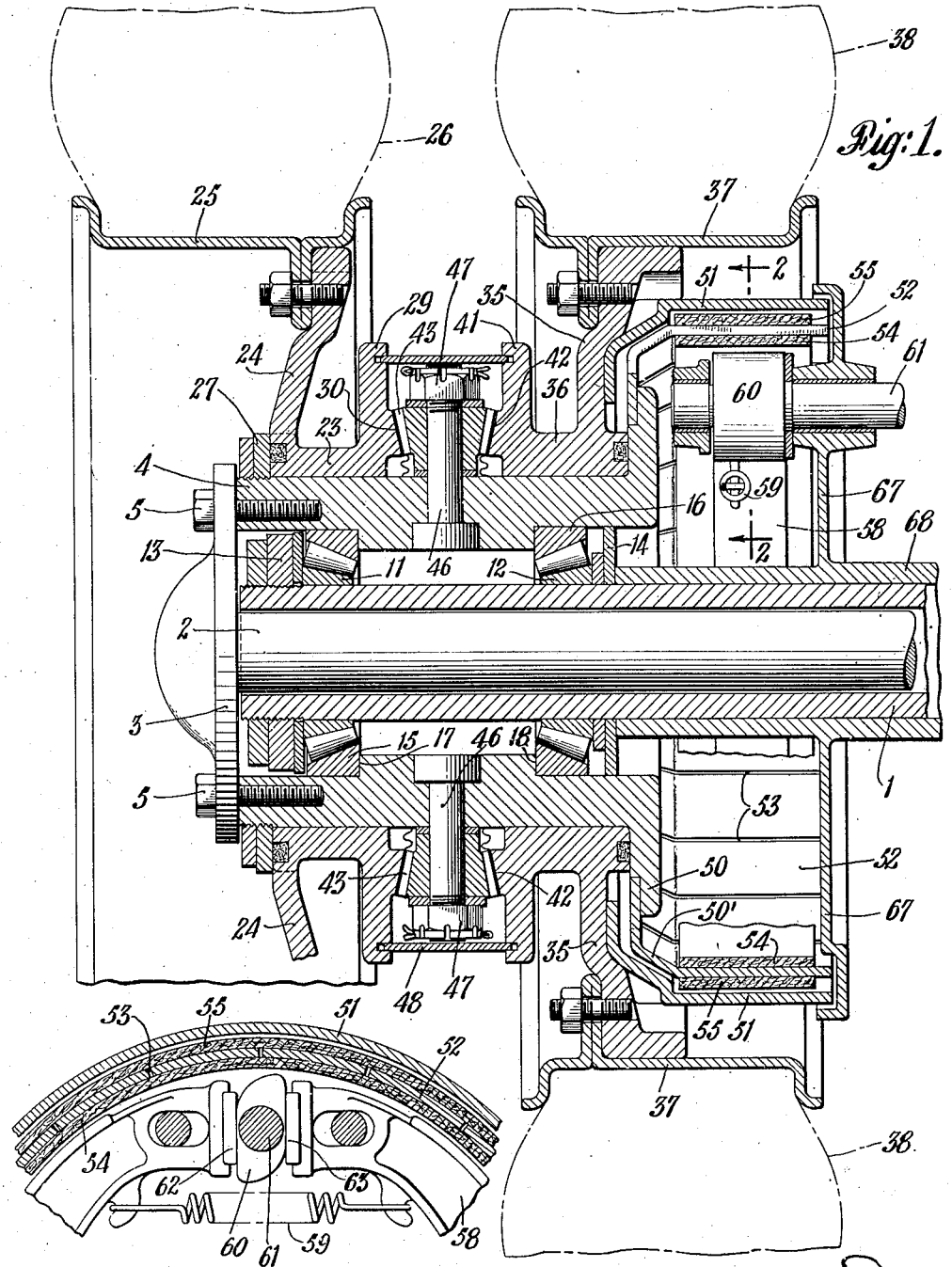

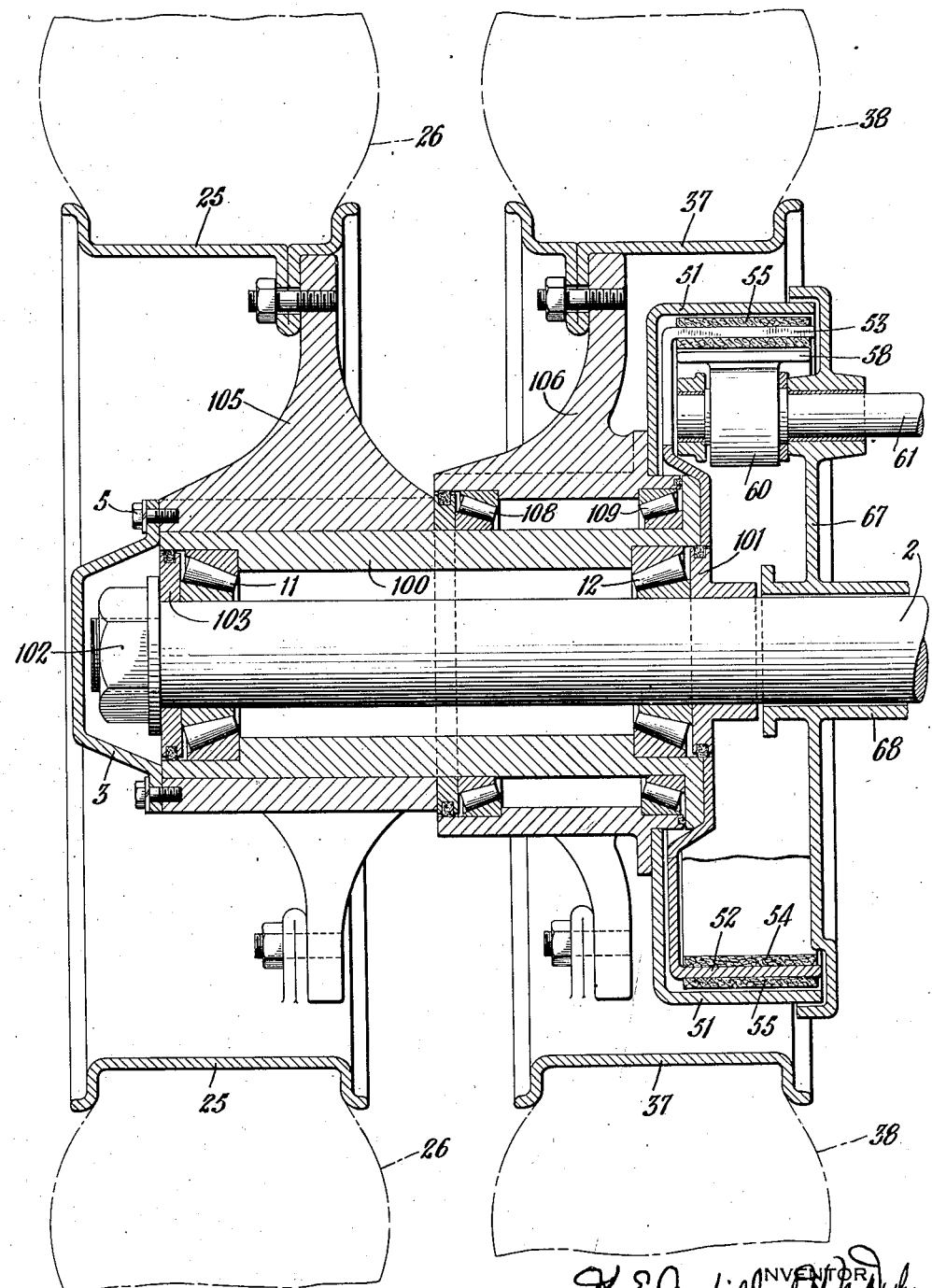

2,135,568

UNITED STATES PATENT OFFICE 2,135,568

DUAL-WHEEL ASSEMBLY

Hobart N. Durham and Kendall E. Canfield, Munsey Park, N. Y., assignors to Detroit Compensating Axle Corporation, Detroit, Mich., a corporation of Delaware Application November 10, 1936, Serial No. 110,090

10 Claims. (Cl. 188—18)

The invention relates to new and useful improvements in dual-wheel heavy-duty wheel assemblies, and more particularly to such improvements in the braking mechanism for such assemblies.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a vertical transverse section through a driven dual-wheel assembly embodying the invention;

Fig. 2 is a fragmentary detail section taken on the line 2—2 of Fig. 1; and

Fig. 3 is a vertical transverse section through an undriven dual wheel assembly embodying the invention.

Objects of the invention are to provide in a dual-wheel assembly having a strong and simple braking mechanism capacitated to exert powerful and cumulative retardant pressure on the wheels, and to apply this pressure in part, and preferably initially equally, or substantially equally, to both wheels, and a final pressure to one of the wheels; to provide a compound braking mechanism capacitated to effect the above described functions, and having other applications as well, wherein a second powerful retardant action may be superimposed on a first braking action of predetermined magnitude and effect, and serving in many regards as emergency braking means operating through the same applying means. These and other objects are realized and exemplified by the mechanism hereinafter described in detail as a present preferred embodiment of the invention.

Referring now in detail to the embodiment of the invention illustrated by way of example in the accompanying drawings, a stationary tubular sleeve 1 may be a part of the usual differential housing employed in motor vehicles. Within the tubular housing 1 is a driven shaft 2, which may be the usual shaft driven from one side of the differential. The shaft 2 at its outer end projects slightly from the end of the housing 1, and fixed to the end of the shaft 2 is a hub cap 3, which cap is fixed to the outer end of a cylindrical sleeve or hub 4 by suitable means such as screw-bolts 5 passing through the cap and threaded into the end of the hub 4. The hub 4 thus rotates with the shaft 2, and is rotatably mounted upon the housing 1.

In the embodied form of said mounting, raceways 11 and 12 of two spaced conical roller bearings encircle and fit upon the exterior of the housing 1. The outer face of the raceway 11 abuts on a lock nut mechanism 13 screw-threaded on the outer end of the non-rotating housing 1. The inner face of the raceway 12 abuts upon washers 14, which abut upon fixed structure, later to be described, the raceway 12 being held against movement along the housing 1. The upper raceways 15 and 16 of the two roller bearings abut on their inner faces, respectively, against annular shoulders 17 and 18 formed on the interior of the hub 4. The hub 4 thus rotates freely on its bearings, on fixed housing 1, and is driven by the shaft 2.

Rotatively mounted on the exterior of the hub 4 is the hub 23 of a wheel 24, which is provided with a rim 25 and a tire 26 of any known or suitable form. The wheel 24 on its exterior face abuts on a lock-nut mechanism 27, screw-threaded on the exterior end of the hub 4. Fixed to the inner end of the wheel hub 23 is an outwardly-extending annular, outwardly projecting flange 29, and formed on the inner face of the flange is a bevel crown gear 30. The inner wheel 35 has its hub 36 likewise rotatively mounted on the hub 4, and this wheel has a suitable rim 37 and tire 38. The hub 36 has on its end a corresponding outwardly-extending annular flange 41, on the outer face of which is formed a bevel crown gear 42. Meshing with both the crown gears 30 and 42 are a plurality of beveled pinions 43, preferably arranged a quadrant apart, these beveled pinions being mounted to rotate freely on radially-disposed stub shafts 46, fixed in and extending outwardly from the hub 4. The pinions are held on their shafts by suitable lock nuts 47, and an annular flat sheet housing 48 fits into annular slots in the faces of the flanges 29 and 41 to constitute a housing for this differential gear. The mechanism described will exert equal tractive action on both wheels and at the same time will permit differential rotation of the wheels due to differences in road surface or in the paths of the wheels.

Means are provided for effecting braking action upon both wheels through the differential gearing and also for effecting braking action directly on one of the wheels. As embodied, a brake drum 51 is fixed on the inner side of wheel 35, and may be of usual construction. Fixed to or integral with the inner end of the hub 4 is an expansible brake drum 52, which is nested within the aforesaid brake drum 51. The brake drum 52 is shown integral with an annular plate-like extension 50 of the hub 4, from which extends a conoidal part 51', which terminates in the cylindrical part 52. This cylindrical drum 52 is rendered expansible by means of spaced apart slots 53 cut in the cylindrical periphery of the drum and preferably extending through the beveled or conoidal part 51 thereof. Brake lining material 54 is attached to the inner peripheral face of the expansible drum 52, and brake lining material 55 is attached to the outer peripheral face of the expansible brake drum.

The means for exerting the retardant pressure on this drum and also for expanding the drum may be the same or similar to the means usually employed for exerting the retardant pressure upon the interior of the usual brake drum construction. As shown, a brake shoe 58 is held in contracted position by spring 59. An actuating cam 60 is fixed on a shaft 61, which shaft is rotatable from the driver's service brake lever or otherwise. The cam 60 abuts on contact pieces 62 and 63 at either end of the shoe 58. As the shaft 61 is rotated in the proper direction, the shoe 58 engages the inner brake lining 54 and effects retardant action upon the hub 4, and through the differential gearing exerts equal retardant action on both wheels, while not interfering with their usual differential action which may be caused by differences in their paths or in the road surface over which the two wheels may be rolling. By increasing the force applied to the shaft 61 the cam 60 will be further moved and the shoe 58 further expanded, and thereby the segments of the expansible brake drum 52 are forced outwardly and the brake lining 55 on the outer faces thereof is pressed against the interior face of the brake drum 51 and thereby additional retardant pressure is exerted directly on the inner wheel 35, and this braking action will occur without interfering with the common retardant action exerted on both wheels through the differential gearing or with the rotatory relative movement of the wheels caused by variations in the wheel paths or in the road surface.

An annular closure plate 67 for the open inner side of the brake drums is fixed to and extends outwardly from a fixed tubular housing 68, to which is connected the springs which carry the chassis in a usual manner. The outer end of tubular housing 68 abuts on washers 14 previously described as facing on roller bearings 12, 16.

Referring now to the modified embodiment shown in Figure 3 of the drawings, the invention is applied to an undriven dual wheel assembly. As embodied, the axle 2 near each of its ends is provided with spaced apart and opposed tapered roller bearings 11 and 12 by which the sleeve 100 is rotatably supported, the sleeve being recessed to seat the outer races of these bearings which are pressed together and against collar 101 by nut 102 and collar 103. The outer wheel 105 is fixed by its hub to the outer portion of sleeve 100 while the hub of the inner wheel 106 is freely and rotatably mounted on sleeve 100 by means of the opposed tapered roller bearings 108 and 109. Thus wheels 105 and 106 are independently rotatable.

At the inner end of sleeve 100 is attached the braking member 52 faced on both sides and slotted as at 53, the outer facing 55 being adapted to frictionally engage the inner surface of the cylindrical brake drum 51 which is fixed to the inner wheel 106. The inner face 54 of the brake member 52 is adapted to engage the brake shoes 10 as in Figure 1.

The mounting and construction of the rims, tires, backing plate and certain other parts may be the same as in the modifications previously described and for that reason need not be repeated.

In the operation of the embodiment of Figure 3, axle 2 is held against rotation, and the wheels 105 and 106 may normally rotate independently and freely on the axle. When application of the brakes is desired, the brake shaft 61 is turned, expanding shoes 58 into contact with the braking member 52 to brake the outer wheel lightly. Further application of the brake causes expansion of the member 52 to apply the braking force to the drum 54 thereby braking both wheels.

The invention in its broader aspects is not limited to the specific mechanisms shown and described but departures may be made therefrom within the scope of the accompanying claims without departing from the principles of the invention and without sacrificing its chief advantages.

What we claim is:
1. In a motor vehicle in combination a hollow axle, a rotatable shaft within the axle, a hub mounted on the axle and connected to rotate with the shaft, wheels rotatably mounted upon said hub, a crown gear on each of said wheels on the side adjacent the other wheel, pinions freely journaled on the exterior of said hub and meshing with both crown gears, and means for braking both wheels through the differential and for braking a wheel directly.

2. In a motor vehicle in combination a hollow axle, a rotatable shaft within the axle, a hub mounted on the axle and connected to rotate with the shaft, wheels rotatably mounted upon said hub, a differential gear drive between said wheels and hub, a brake drum fixed to one of said wheels, an expansible brake drum fixed to said hub and nested within the first mentioned brake drum, and a brake shoe within said expansible drum and actuable to exert pressure on the expansible drum to brake both wheels through the differential and actuable also to expand the expansible drum to exert braking pressure directly on the first mentioned drum.

3. In a motor vehicle in combination a hollow axle, a rotatable shaft within the axle, a hub mounted on the axle and connected to rotate with the shaft, wheels rotatably mounted upon said hub, a crown gear on each of said wheels on the side adjacent the other wheel, pinions freely journaled on the exterior of said hub and meshing with both crown gears, a brake drum fixed to one of said wheels, an expansible brake drum fixed to said hub and nested within the first mentioned brake drum, and a brake shoe within said expansible drum and actuable to exert pressure on the expansible drum to brake both wheels through the differential and actuable also to expand the expansible drum to exert braking pressure directly on the first mentioned drum.

4. In a dual-wheel assembly a pair of independently rotatable wheels, a pair of brake drums, and an expansible device adapted to effect braking pressure on one or both of said drums.

5. In a dual-wheel assembly a pair of independently rotatable wheels, a pair of brake drums nested one within another, and an expansible device adapted to effect braking pressure on one or both of said drums.

6. In a dual-wheel assembly a pair of independently rotatable wheels, a pair of brake drums nested one within another, the inner brake drum having brake lining on the inside and outside of its periphery, and an expansible device adapted to effect braking pressure on one or both of said drums.

7. In a dual-wheel assembly a pair of independently rotatable wheels, a pair of brake drums nested one within another, the inner drum having a slotted expansible peripheral rim, and an expansible device adapted to effect braking pressure on one or both of said drums.

8. In a dual-wheel assembly a pair of independently rotatable wheels, a pair of brake drums nested one within another, the inner drum having a slotted expansible peripheral rim, said rim having brake lining on the inside and outside thereof, and an expansible device adapted to effect braking pressure on one or both of said drums.

9. In a motor vehicle in combination an axle, a pair of wheels mounted on the axle for independent rotation, a pair of closely adjacent braking elements, one fixed to each wheel and a braking element held against rotation to apply a braking force to both wheels.

10. In a motor vehicle in combination an axle, a sleeve rotatably mounted on the axle, a wheel secured to the sleeve, a second wheel rotatable on the sleeve, a braking element on the second wheel, a braking element on the sleeve and adjacent the first element, and a third braking element held against rotation and movable with respect to the first two elements to retard their rotation.

HOBART N. DURHAM.
KENDALL E. CANFIELD.